Feb. 26, 1929.                                              1,703,829
M. H. PADE
CONVEYER
Filed May 3, 1924                        4 Sheets-Sheet 3
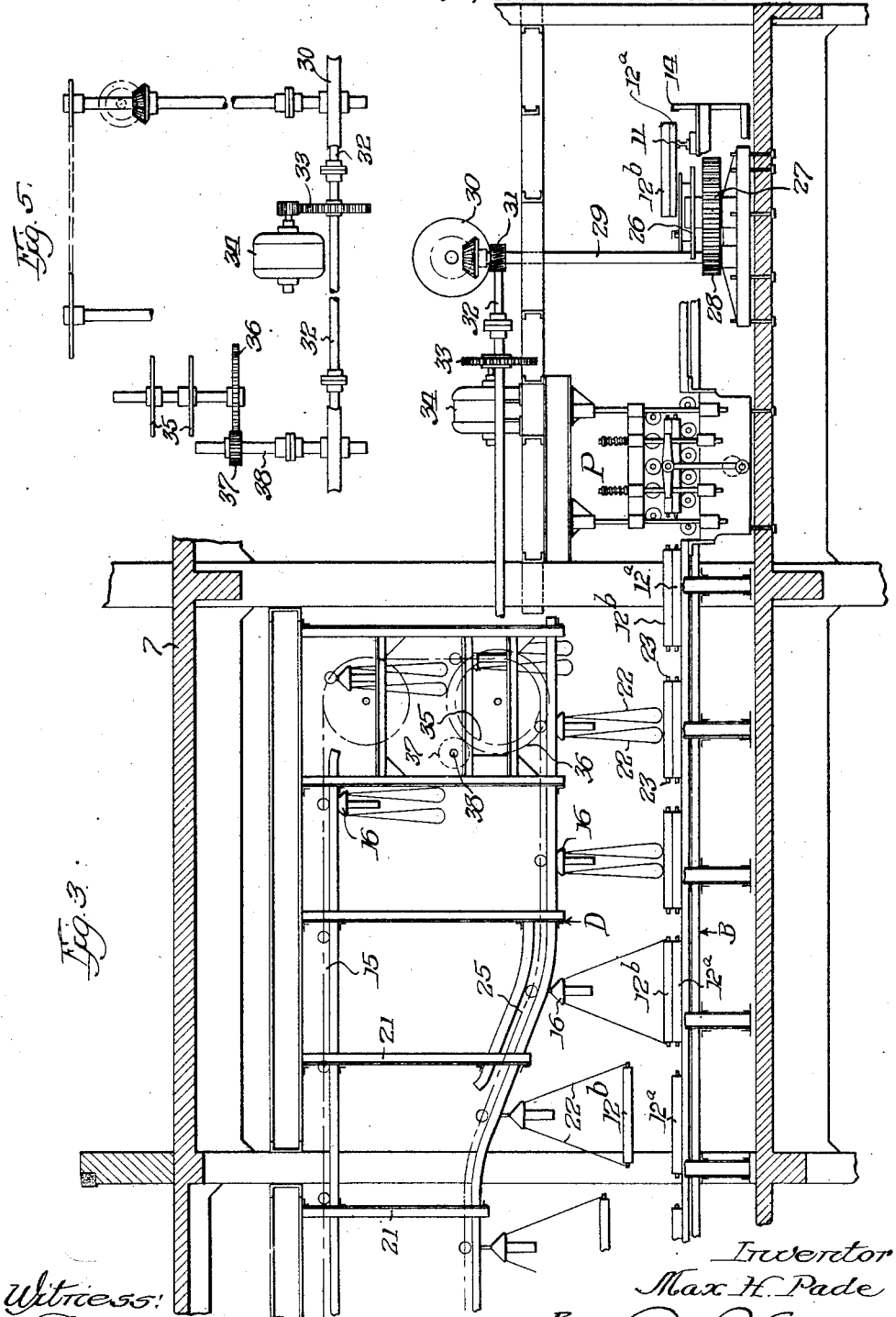

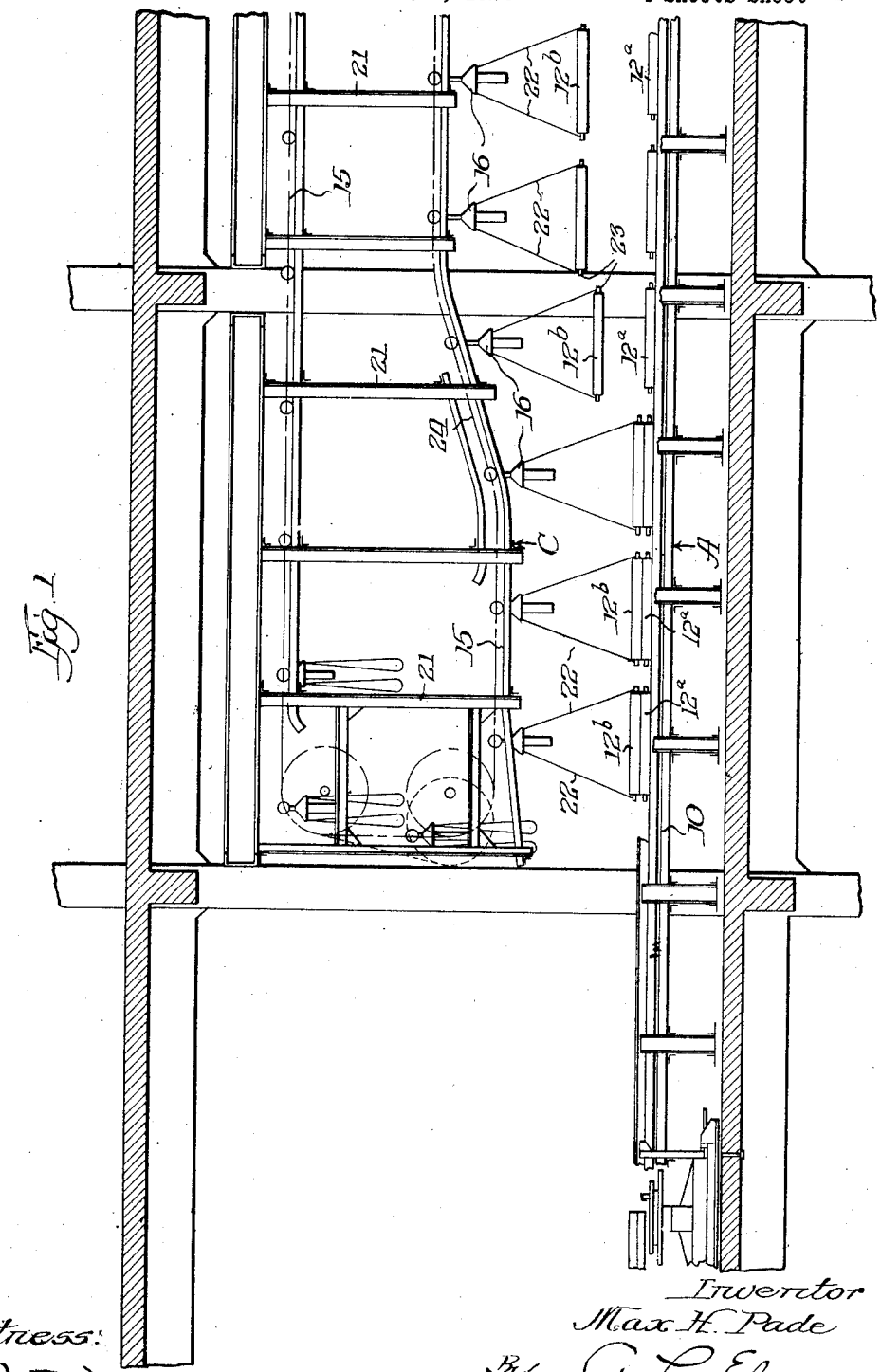

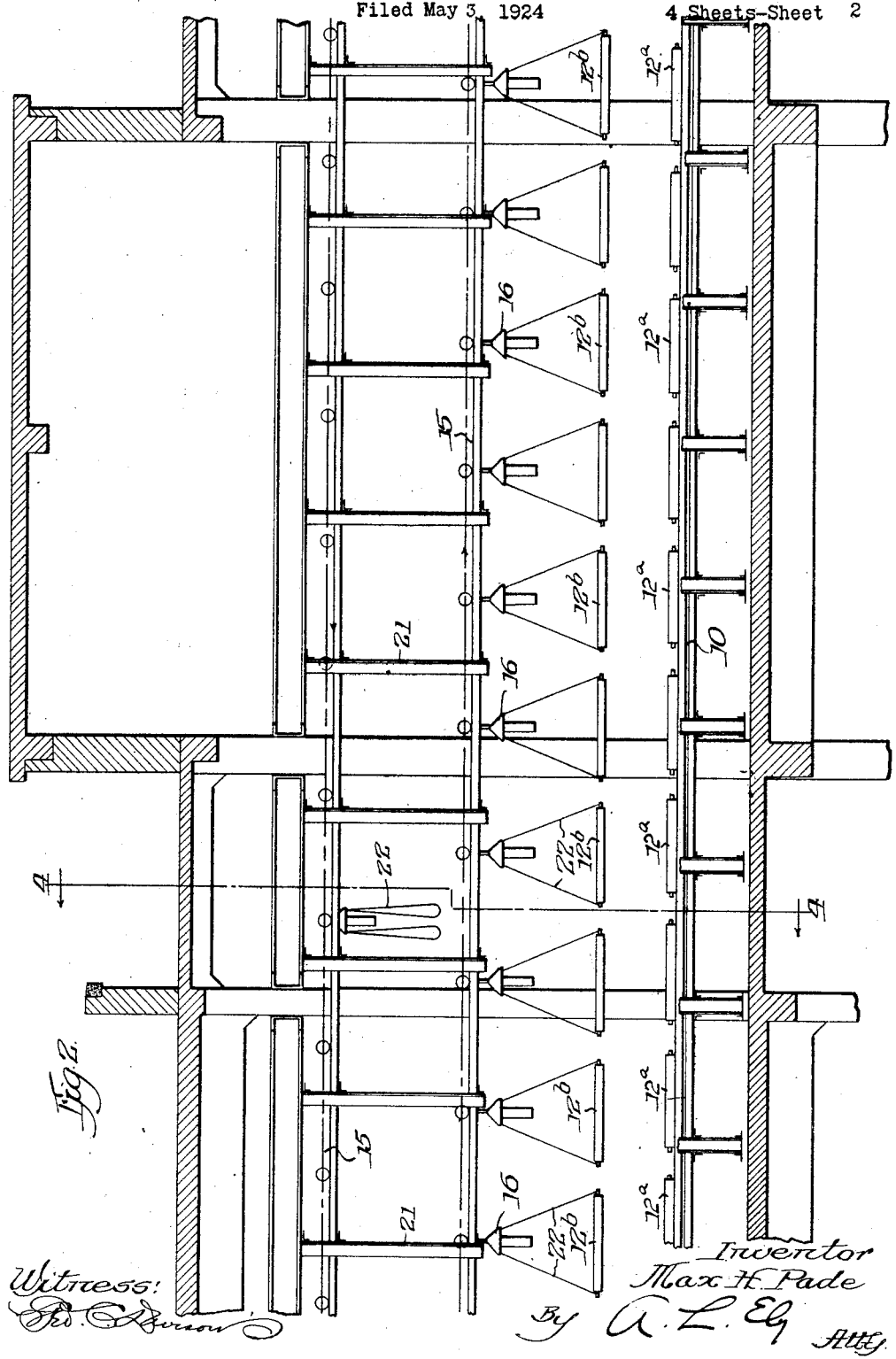

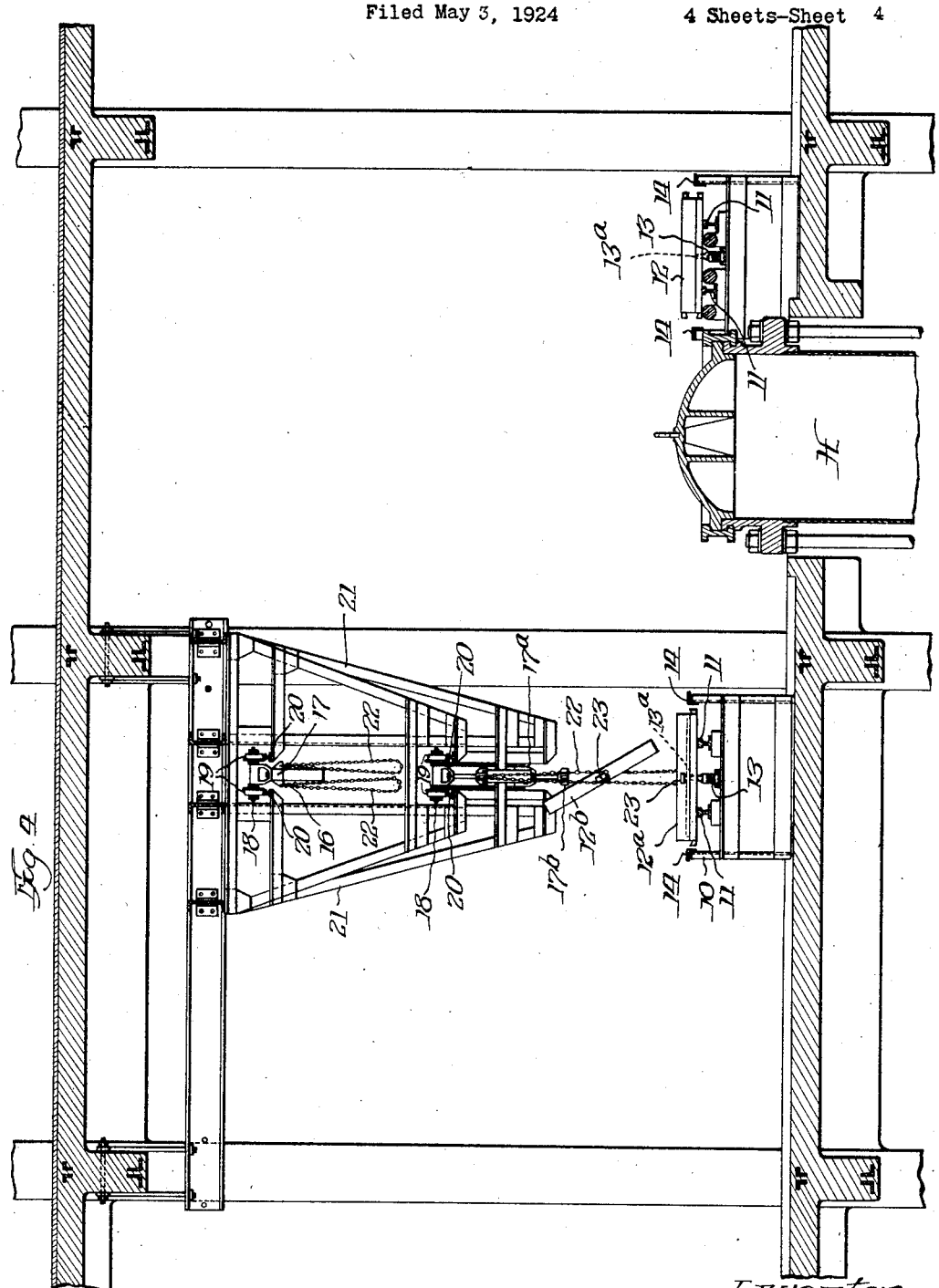

Patented Feb. 26, 1929.

1,703,829

UNITED STATES PATENT OFFICE.

MAX H. PADE, OF AKRON, OHIO, ASSIGNOR TO THE FIRESTONE TIRE AND RUBBER COMPANY, OF AKRON, OHIO, A CORPORATION OF OHIO.

CONVEYER.

Application filed May 3, 1924. Serial No. 710,744.

This invention relates to mold conveyers and is particularly adapted for use in the manufacture of tires.

In the manufacture of tires, the latter after having been built, are inserted in vulcanizing molds which are stacked in heater presses and subjected to temperatures at which the tires will be vulcanized while maintained under pressure therein. In modern tire factories, tire-molds are carried to and from the heaters on a conveyer, the loading of the molds with uncured tires and the unloading of the molds containing cured tires being accomplished while the molds are traveling on the conveyer.

During the mold unloading and loading operations the upper sections of the molds necessarily must be separated from the lower sections and for this purpose, a second conveyer has been employed for lifting the upper sections of the molds from the lower sections, carrying the upper sections past the unloading and loading stations, and then lowering the upper sections so that they may be placed on the lower sections after the loading operation.

The main conveyer and the conveyer for the upper mold sections have been driven from the same source of power so that in a measure their operation has been synchronized, but owing to the fact that the conveyer for the upper mold sections travels over a path somewhat longer than the corresponding portion of the main conveyer with which it cooperates it has heretofore been necessary for a number of workmen to swing the upper mold sections into registry with the lower ones after the molds have been loaded, and to permit the upper sections to swing out of such registry at the unloading station.

It is the purpose of the present invention to improve upon conveyers of the above-described type and particularly to provide conveyers so synchronized in their operations that the devices on the upper conveyer for carrying the mold sections will always be in such relative position to the mold engaging devices on the lower conveyer at the point where the mold parts are separated that the molds will be separated substantially, vertically and especially that these devices will always be in such relative position at the point after the loading station where the upper mold sections are applied to the lower ones that the mold parts will register with little or no manual assistance being required.

More specific purposes and objects will appear from the following detailed description in connection with the accompanying drawings which illustrate an embodiment of the invention, it being understood that the invention is not wholly limited in the claims to the specific form thereof shown.

Figures 1, 2, and 3, taken together, illustrate a complete side elevation of apparatus embodying the invention in its preferred form.

Figure 4, is a section on line 4—4 of Figure 2.

Figure 5, is a detail plan of driving connections for the upper conveyer.

Referring to the drawings, 10 represents a horizontal conveyer arranged to encircle a line of heater presses as will be understood by skilled artisans. As shown in Figure 4, the conveyer 10 may comprise rails 11, 11 on which molds 12, 12 may slide, conveyer chain 13 for sliding the molds 12 on the rails 11 and guides 14, 14 for retaining the molds on the rails. The chain 13 has spaced mold-engaging lugs $13^a$, $13^a$ mounted thereon in a known manner.

Cooperating with a conveyer 10 over a portion of its path is a second conveyer 15 having an upper and lower flight and adapted to carry upper mold sections $12^b$ during the operation of unloading cured tires from the molds, cleaning the molds etc., and loading the uncured tires into the molds. For this purpose, the conveyer 15 has spaced thereon devices 16, 16, for carrying the upper mold sections. Each device 16 (Figure 4) comprises a bracket composed of telescoping parts $17^a$ and $17^b$ of a known type suspended on a shaft 18 on which is journaled flanged rollers 19, 19 adapted to travel on rails 20, 20, there being an upper and lower set of rails 20, suitably supported on frame structure 21, 21, which are mounted above the conveyer 10 in any suitable manner.

On each bracket 17 are secured a pair of looped chains 22, 22, adapted to engage lugs 23, 23, formed on the mold sections, the chains being of such length and the telescopic movement of parts $17^a$ and $17^b$ being such as to permit an operator to pass the former over the ends of the lugs of the upper sections of molds on the conveyer 10 when at positions C and D of the conveyer 15. The chains 22 are adapted to permit tilting of the upper mold sections for cleaning the same, as illustrated in Figure 4.

The conveyer 15 is arranged so as to travel up an upwardly inclined path at 24 (Figure 1) and down a sloping path at 25 (Figure 3) the portion of the conveyer 15 between these points being so spaced from the conveyer 10 that mold sections 12$^b$ will be sufficiently withdrawn to permit the unloading, cleaning and reloading of the molds while the conveyers are in motion. Due to the inclined paths 24 and 25 the conveyer 15 must travel a longer distance over its lower flight than the corresponding travel of the conveyer 10. In order that the mold parts 12$^a$ and 12$^b$ shall be supported in registry by the conveyers 10 and 15 at the mold opening and mold closing stations, the devices 16 on the conveyer 15 are spaced a greater distance apart than are the mold-engaging lugs 13$^a$ on the chain 13. The proper spacing of the devices 16 can be determined from the spacing of the lugs 13$^a$ on the chain 13 and the ratio of the length of travel between the mold-opening and mold-closing stations.

For example, in the device illustrated, the lugs 13$^a$ are 4' 6" apart while the devices 16 are 4' 6½" apart the ratio of 4' 6" to 4' 6½" being the ratio of the length A B on the conveyer 10 to the length C D on the conveyer 15.

Because of the greater length of travel of the conveyer 15 over the portion C D than the conveyer 10 over the portion A B, the conveyer 15 must be driven at a higher rate of speed, and since the conveyers 10 and 15 must be synchronized they preferably should be driven from the same source of power. To this end the conveyer chain 13 is adapted to be driven by a sprocket 26 driven by a gear 27, which in turn is driven by a pinion 28, secured on a shaft 29, which latter is driven by a worm gear 30, meshing with a worm 31, on a drive shaft 32. The drive shaft 32 is driven by a gear 33 secured thereon and meshing with a gear on the shaft of a motor 34.

The conveyer 15 is similarly driven, as shown in Fig. 5, by a sprocket 35, gear 36, pinion 37 on a shaft 38, worm gear on shaft 38, and worm on shaft 32. The circumference of sprocket 35 is, however, greater than the sprocket 26 by the ratio in this particular case of 4' 6½" to 4' 6", both sprockets, however, having the same number of teeth so that the lineal speed of the conveyer 15 will be at that ratio to the lineal speed of conveyer 10.

In operation the conveyers 10 and 15 will be continuously driven, the loops 22 being engaged on lugs 23 of each upper mold section prior to the position "A" and "C" on the respective conveyers. At these positions separation of the mold parts occurs. In travelling up the incline 24 it will be noted that the lower mold sections obtain a lead on the upper sections. Along the horizontal stretch of the upper conveyer between the inclines the upper mold sections steadily gain on the lower ones passing them at the middle of the stretch and at the top of the sloping track 25 leading the lower mold sections. This lead, however, is lost in coming down the incline 25 so that at the "B" and "D" positions of the respective conveyers the mold parts are brought into registry with each other.

Between the positions "A", "C", and "B", "D", the molds are unloaded, cleaned, lubricated and reloaded as will be understood. They then pass through a press P (Fig. 3) for closing the mold parts and finally to a series of heaters H (Fig. 4) for the vulcanizing operation. From the heaters H the molds are carried back to the various stations, it being understood that such a number of heaters preferably are employed, that at least one heater is being emptied so as to furnish the conveyer with molds to be operated upon at all times.

Modifications of the invention may be resorted to without departing from the spirit or scope of the invention as claimed in the appended claims.

I claim:

1. Apparatus of the character described comprising cooperating conveyers one of which travels between two positions along a path greater than the corresponding path of the other, work engaging devices spaced along each of said conveyers, the devices on the conveyer travelling along the longer path being spaced farther apart than the devices on the other conveyer, and means for driving said conveyers whereby juxtaposed devices on the coneveyers will always register at one position of the conveyers.

2. Apparatus of the character described comprising cooperating conveyers one of which travels between two positions a greater distance than the corresponding travel of the other, equally spaced devices on the one for engaging mold sections, equally spaced devices on the other for engaging mold sections, the devices on the conveyer travelling along the greater distance being spaced farther apart than the devices on the other conveyer, and means for driving said conveyers whereby said devices will always register mold sections at one position of the conveyers.

3. Apparatus of the character described comprising cooperating conveyers one of which travels between two positions a greater distance than the corresponding travel of the other, equally spaced devices on the one for engaging mold sections, equally spaced devices on the other for engaging corresponding mold sections, said devices on the one conveyer being spaced apart a distance greater than those on the other conveyer in the ratio of their distances of travel between said positions, and means for driving said conveyers whereby said devices will always register corresponding mold sections at one position of the conveyers.

4. Apparatus of the character described comprising cooperating conveyers one of which travels between two positions a greater distance than the corresponding travel of the other, equally spaced devices on the one for engaging mold sections, equally spaced devices on the other adapted to be engaged with mold sections, said devices on the one conveyor being spaced apart a distance greater than those on the other conveyer in the ratio of their distances of travel between said positions, and means for driving the conveyers whereby the one conveyer will be driven at a speed greater than the other conveyer in the ratio of their distances of travel between said positions.

5. Apparatus for conveying tire-molds comprising a lower conveyer and an upper conveyer, equally spaced devices on the lower conveyer for engaging the molds and equally-spaced devices on the upper conveyer adapted to be engaged with the upper sections of the molds, said upper conveyer being arranged to lift said sections from the lower sections of the molds to carry them at a higher elevation during mold unloading, cleaning and reloading operations and to lower them onto the lower sections after said operations, the spacing of the devices on the upper conveyer being such as compared with the spacing of the devices on the lower conveyer as to correct for the greater distance of travel of the former, and means for driving the conveyers whereby the upper conveyer will be driven at a correspondingly increased rate so that the relative positions of corresponding mold-engaging devices will always be the same at mold-opening and mold-closing stations.

MAX H. PADE.